Figure 1:
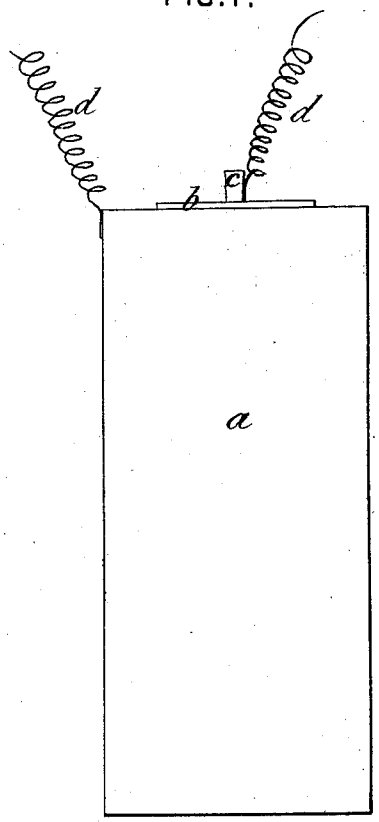

(No Model.)

J. A. THIÉBAUT.
DRY PILE.

No. 304,764. Patented Sept. 9, 1884.

Witnesses:
John C. Tunbridge.
John M. Speer.

Inventor:
J. A. Thiébaut
by his attorneys
Briesen & Steele

UNITED STATES PATENT OFFICE.

JULES ALPHONSE THIÉBAUT, OF PARIS, FRANCE.

DRY PILE.

SPECIFICATION forming part of Letters Patent No. 304,764, dated September 9, 1884.

Application filed October 29, 1883. (No model.) Patented in France April 26, 1883, No. 142,524.

*To all whom it may concern:*

Be it known that I, JULES ALPHONSE THIÉBAUT, of the city of Paris, France, have invented new and useful Improvements in Dry Piles, of which the following is a full, clear, and exact description, and for which French Patent No. 142,524, dated April 26, 1883, has been granted for fifteen years.

My invention relates to improvements in dry piles; and it consists in a dry-pile cell based upon the absorption of the atmospheric moisture. The positive element of the cell consists of a zinc vessel terminating in its upper part in a tongue or wire for connecting it with the neighboring cell or with the circuit-wire. The negative element consists of a plate, prism, or block of coke, which is placed in the zinc vessel in such a way as not to touch it in any point. This carbon has a small hole at its upper part, in which is fixed, by a peg or otherwise, a conducting-wire. The conducting-mixture employed in the pile is composed of potash, soda, or ammonia mixed with gypsum and peroxide of manganese. The following proportions of these various ingredients give a good result: crude pearlash, seven ounces; gypsum, fourteen ounces; peroxide of manganese, containing ninety per cent. of this substance when dry, reduced to a powder of about the size of a pin's head, three ounces. Or, chloride of sodium or hydrochlorate of ammonia, two-thirds; gypsum, one-third, which makes a suitable mixture, and corresponds to a quantity of peroxide of manganese analogous to that of the preceding mixture. I can substitute for the gypsum lime, (slaked or not,) cement, clay, or other analogous material; but I prefer to employ gypsum or certain varieties of cement that increase in volume as they solidify, and thus assure good contact with the zinc and carbon elements.

In the first mixture above described the peroxide of manganese should be pounded and the resulting dust employed, whereas in the other mixture, where the peroxide of manganese is employed separately, it is not necessary that this compound be reduced to powder. The materials of the first mixture, or those of the second without peroxide of manganese, are stirred together, so as to make a good mixture, and one or the other of these mixtures is poured and rammed into the bottom of the zinc vessel above described, so as to form a layer of about one thirty-second of an inch in thickness. In the case of the first mixture, the carbon forming the second element is placed in the zinc vessel in such a manner as not to touch the zinc sides, and the mixture is well rammed into the remaining space. In the case of the second mixture, instead of placing the carbon in the vessel, any object is put in its place—a glass tube, for example—but of a larger diameter than the carbon, and the mixture is rammed in between the zinc and the glass tube. Then a little water is poured in to make the mixture set, and about a minute after that the glass tube is withdrawn. There then remains in the center a space for the carbon, which is placed in it, and the peroxide of manganese, in grains, mixed in equal quantities with pounded coke, is rammed in around it, so as to fill up the space. For still further increasing the effect produced, I place in the space reserved for the carbon agglomerated plates of peroxide of manganese, which are attached to the carbon plate by means of a string or otherwise, so as to insure a good contact between the peroxide plates and the carbon. When the zinc vessel is filled to the top with one or the other of the above-named mixtures, I tap it on something hard, in order to densify the mixture, and then I pour a little water on it, to make the mass set well, and the cell is finished. I can also employ, as positive element to be placed in the center of the zinc vessel, a mixture of carbon and peroxide of manganese. The employment of the mixture of peroxide of manganese and of carbon as element of the cell of the pile gives a cell of a greater electro-motive force than is obtained by the employment of the first-named mixture.

Any form, dimensions, and detail arrangements may be given to this pile without departing from the principle of my invention. In order that it may be well understood I have represented a specimen of it in the annexed drawings, in which—

Figure 2:
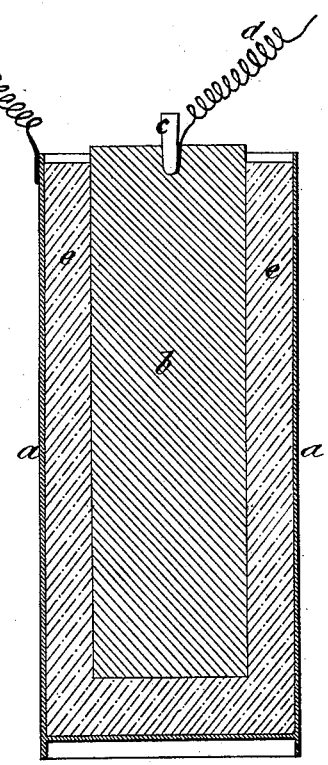
Figure 3:
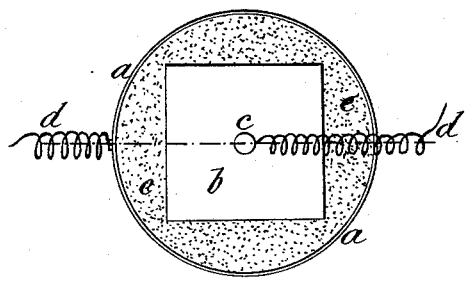

Figure 1 is a side view of the battery or pile. Fig. 2 is a vertical central section of the same. Fig. 3 is a plan of the same.

*a* is the zinc vessel forming one of the elements. The bottom of this vessel is hollow or raised, in order to allow it to be placed upon washers or base-pieces of wood or insulating matter in case the cells have to rest upon metallic pieces or good conductors of electricity.

$b$ represents the piece of carbon having the form of a square prism, and having at its upper end a hole for the reception of the wooden peg $c$.

$d\ d$ are the circuit-wires; $e$, the agglomerated conducting-mixture.

I claim—

1. In a dry pile, the agglomerated conducting-mixture composed of potash, gypsum, and peroxide of manganese, substantially as above described, and for the purpose set forth.

2. The combination, with an exterior vessel, $a$, forming one of the elements of the cell, of another element, $b$, composed of a piece of carbon and of a dry conducting-mixture of peroxide of manganese, gypsum, and potash, substantially as specified.

The foregoing specification of my improvements in dry piles signed by me this 22d day of September, 1883.

JULES ALPHONSE THIÉBAUT.

Witnesses:
ROBT. M. HOOPER,
JEAN BAPTISTE ROLLAND.